US008805892B2

(12) United States Patent
Zhang et al.

(10) Patent No.: US 8,805,892 B2
(45) Date of Patent: Aug. 12, 2014

(54) SYSTEMS AND METHODS OF STORING AND MANAGING CONFIGURATION DATA IN TELECOMMUNICATIONS SYSTEMS AND DEVICES

(75) Inventors: Xingguo Zhang, Fremont, CA (US); Yimin Zhu, Sunnyvale, CA (US)

(73) Assignee: Dialogic Inc., Milpitas, CA (US)

( * ) Notice: Subject to any disclaimer, the term of this patent is extended or adjusted under 35 U.S.C. 154(b) by 113 days.

(21) Appl. No.: 13/364,677

(22) Filed: Feb. 2, 2012

(65) Prior Publication Data

US 2013/0204845 A1 Aug. 8, 2013

(51) Int. Cl.
*G06F 17/30* (2006.01)

(52) U.S. Cl.
USPC .......................................................... 707/802

(58) Field of Classification Search
None
See application file for complete search history.

(56) References Cited

U.S. PATENT DOCUMENTS 8,255,432 B2 * 8/2012 Ackerman et al. ............ 707/809
2010/0100870 A1 * 4/2010 Vandanapu .................. 717/121

* cited by examiner

*Primary Examiner* — Hung Q Pham
(74) *Attorney, Agent, or Firm* — Chapin IP Law, LLC

(57) ABSTRACT

Systems and methods of storing and managing data, such as configuration data, in telecommunications systems and devices. The data are stored as objects, each data object having an associated type, and each object type having at least one instance of the data object. Each instance of each data object has a primary key field, which identifies that instance of the data object. Each instance of each data object can have zero or more foreign key fields, each of which can be used to make reference to the primary key of at least one other data object. By employing at least the foreign key fields and the primary keys of the respective data objects, various referential relationships, branching referential relationships, and many-to-many relationships among one or more groups of the object types can be defined and maintained, for use in storing and/or managing the data with increased flexibility and efficiency.

11 Claims, 6 Drawing Sheets

SYSTEMS AND METHODS OF STORING AND MANAGING CONFIGURATION DATA IN TELECOMMUNICATIONS SYSTEMS AND DEVICES

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to telecommunications systems and devices, and more specifically to systems and methods of storing and managing data, such as configuration data, in telecommunications systems and devices.

BACKGROUND OF THE INVENTION

Telecommunications systems and devices, such as access systems, network management systems, media switching centers, cross-connects, session border controllers, etc., can be adapted via configuration data to provide specific functionality for a target application. Based on such configuration data, control software within the telecommunications systems and devices can control the respective systems and devices to satisfy the requirements of the target application. For example, such configuration data can be specified for a session border controller to satisfy the requirements of access and interconnect applications within mobile and/or fixed voice-over-Internet protocol (VoIP) networks. By adapting the session border controller using such configuration data, the session border controller can be effectively controlled to provide security for the interconnect and access network infrastructure, thereby assuring that VoIP services are made continuously available while maintaining a high level of system performance.

In typical telecommunications systems and devices, large amounts of complex configuration data must generally be stored and managed. Such telecommunications systems and devices can employ relational database management systems to handle the storage and management of such large amounts of complex configuration data. However, relational database management systems can be expensive to use, can lack flexibility, and can often consume inordinate amounts of processor and/or memory resources within the respective telecommunications systems and devices.

It would therefore be desirable to have improved systems and methods of storing and managing data, such as configuration data, in telecommunications systems and devices that avoid at least some of the drawbacks relating to the use of relational database management systems for storing and managing such data.

BRIEF SUMMARY OF THE INVENTION

In accordance with the present application, improved systems and methods of storing and managing data, such as configuration data, in telecommunications systems and devices are disclosed. In the presently disclosed systems and methods, the data are stored as objects (such objects are also referred to herein as "data objects"), in which each data object has an associated type (such an associated type of data object is also referred to herein as an/the "object type"), and each object type has at least one instance of the data object. Each instance of each data object has a primary key field, which identifies that instance of the data object. Each instance of each data object can also have zero or more foreign key fields, each of which can be used to make reference to the primary key associated with at least one other data object. By employing at least the foreign key fields and the primary keys associated with the respective data objects, various referential relationships, branching referential relationships, and many-to-many relationships among one or more groups of the object types, can be beneficially defined and maintained for storing and managing the data with increased flexibility and efficiency.

In accordance with one aspect, a first exemplary method of storing and managing data, such as configuration data, in telecommunications systems and devices is provided that can maintain referential integrity among a plurality of data objects when a respective data object is created, modified, and/or deleted. In accordance with an exemplary aspect, the plurality of data objects are stored in a hierarchy of directories in a file system, in which each object type corresponds to a respective directory, and, for the object type, each instance of the data object is stored in a specific data file in the respective directory. In accordance with the first exemplary method of storing and managing data in telecommunications systems and devices, for one or more instances of the data object for the object type, a first list (such a first list is also referred to herein as an/the "add list") can be generated that contains a listing of object types that are referred to by the foreign keys of that instance of the data object, and a second list (such a second list is also referred to herein as a/the "delete list") can be generated that contains a listing of object types with foreign keys that refer to the primary key associated with that instance of the data object. In further accordance with this first exemplary method, at least at some times, an instance of the data object for the object type is to be created or modified, thereby causing a first data file (such a first data file is also referred to herein as an/the "add file") to be generated for the object type, in which the add file contains the data files for the object type, and the data files for the object types contained in the add list. Using at least the add file, a first data object validation process is performed to check the validity and consistency of the foreign keys of the instances of the data objects for the object type. In still further accordance with this first exemplary method, at least at some times, an instance of the data object for the object type is to be deleted, thereby causing a second data file (such a second data file is also referred to herein as a/the "delete file") to be generated for the object type, in which the delete file contains the data files for the object type, and the data files for the object types contained in the delete list. Using at least the delete file, a second data object validation process is performed to check the validity and consistency of the foreign keys that refer to the instances of the data objects for the object type. In this way, the referential integrity can be maintained among the plurality of data objects when a respective data object is created, modified, and/or deleted.

In accordance with another aspect, a second exemplary method of storing and managing data, such as configuration data, in telecommunications systems and devices is provided, which can be used to establish a first type of branching referential relationship among a plurality of data objects. In accordance with an exemplary aspect, a first object type has a plurality of instances of a data object, in which each instance of the data object has a primary key field, which identifies that instance of the data object. Each instance of the data object also has at least one foreign key field, and at least one second field associated with the foreign key field. The foreign key field of each instance of the data object can be used to make reference to the primary key(s) associated with one or more other data objects based on the value of the second field. In effect, multiple views of the first object type can be defined and maintained based on the value contained in the second field. In accordance with the second exemplary method of storing and managing data in telecommunications systems and devices, for a first view of the first object type, a first add list is generated that contains a listing of at least one second object type that is referred to by the foreign key based on a first value of the second field. Further, for a second view of the first object type, a second add list is generated that contains a listing of at least one third object type that is referred to by the foreign key based on a second value of the second field. In further accordance with this second exemplary method, at least at some times, an instance of a data object for the first object type is to be created or modified, thereby causing an add file to be generated for the first object type, in which the add file contains the data files for the first and second views of the first object type, the data files for the second object type contained in the first add list, and the data files for the third object type contained in the second add list. Using at least the add file, one or more data object validation processes are performed to check the validity and consistency of the foreign keys of the instances of the data objects for the first object type. In this way, referential integrity can be maintained among the plurality of data objects having the first type of branching referential relationship when a respective data object having the first object type is created or modified.

In accordance with a further aspect, a third exemplary method of storing and managing data, such as configuration data, in telecommunications systems and devices is provided, which can be used to establish a second type of branching referential relationship among a plurality of data objects. In accordance with an exemplary aspect, a first object type has at least one instance of a data object, in which each instance of the data object has a primary key field, which identifies that instance of the data object. Each instance of the data object also has at least one first foreign key field and at least one second foreign key field, which can be used to make reference to the primary keys of multiple views of a second object type. A first view of the second object type has at least one first instance of a data object, in which the first instance of the data object has a primary key field identifying that instance of the data object, and at least one additional field that is referred to herein as a/the "third field." The first foreign key field of the instance of the data object for the first object type can be used to make reference to the primary key of the first instance of the data object for the first view of the second object type, based on the value of the third field of the first instance of the data object for the second object type. Further, a second view of the second object type has at least one second instance of the data object, in which each second instance of the data object has a primary key field identifying that instance of the data object, and at least one additional field, which is also referred to herein as a/the "third field." The second foreign key field of the instance of the data object for the first object type can be used to make reference to the primary key of the second instance of the data object for the second view of the second object type, based on the value of the third field of the second instance of the data object for the second object type. In accordance with this third exemplary method, for the first object type, a first add list is generated that contains a listing of at least the first view of the second object type that is referred to by the first foreign key of the instance of the data object for the first object type, based on the value of the third field of the first instance of the data object for the second object type. Further, a second add list is generated that contains a listing of at least the second view of the second object type that is referred to by the second foreign key of the instance of the data object for the first object type, based on the value of the third field of the second instance of the data object for the second object type. In further accordance with this third exemplary method, at least at some times, an instance of a data object for the first object type is to be created or modified, thereby causing an add file to be generated for the first object type. The add file contains the data files for the first object type, the data files for the first view of the second object type contained in the first add list, and the data files for the second view of the second object type contained in the second add list. Using at least the add file, one or more data object validation processes are performed to check the validity and consistency of the foreign keys of the instance(s) of the data object for the first object type. In this way, referential integrity can be maintained among the plurality of data objects having the second type of branching referential relationship when a respective data object having the first object type is created or modified.

In accordance with yet another aspect, a fourth exemplary method of storing and managing data, such as configuration data, in telecommunications systems and devices is provided, which can be used to establish a many-to-many relationship between a plurality of object types. In accordance with an exemplary aspect, a first object type has at least one instance of a data object, in which the instance of the data object has a nested foreign key field. The nested foreign key field of the instance of the data object includes a sequence of foreign key fields, each of which can be used to make reference to the primary key associated with at least one instance of another data object for a second object type. Using such a nested foreign key field of an instance of a data object, a many-to-many relationship between a plurality of object types can be established without having to create any new association object types, as would typically be required if a relational database management system were employed.

By employing at least the foreign key fields and the primary keys associated with the data objects for a plurality of object types, various referential relationships, branching referential relationships, and many-to-many relationships among one or more groups of object types can be beneficially defined and maintained. Such relationships among various object types can be used to store and/or manage data, such as configuration data, in telecommunications systems and devices, with increased flexibility and efficiency.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of storing and managing data, such as configuration data, in telecommunications systems and devices are disclosed. In the presently disclosed systems and methods, the data are stored as objects (such objects are also referred to herein as "data objects"), in which each data object has an associated type (such an associated type of data object is also referred to herein as an/the "object type"), and each object type has at least one instance of the data object. Each instance of each data object has a primary key field, which identifies that instance of the data object. Each instance of each data object can also have zero or more foreign key fields, each of which can be used to make reference to the primary key associated with at least one other data object. By employing at least the foreign key fields and the primary keys associated with the respective data objects, various referential relationships, branching referential relationships, and many-to-many relationships among one or more groups of the object types can be defined and maintained, for use in storing and managing the data with increased flexibility and efficiency.

Figure 1:
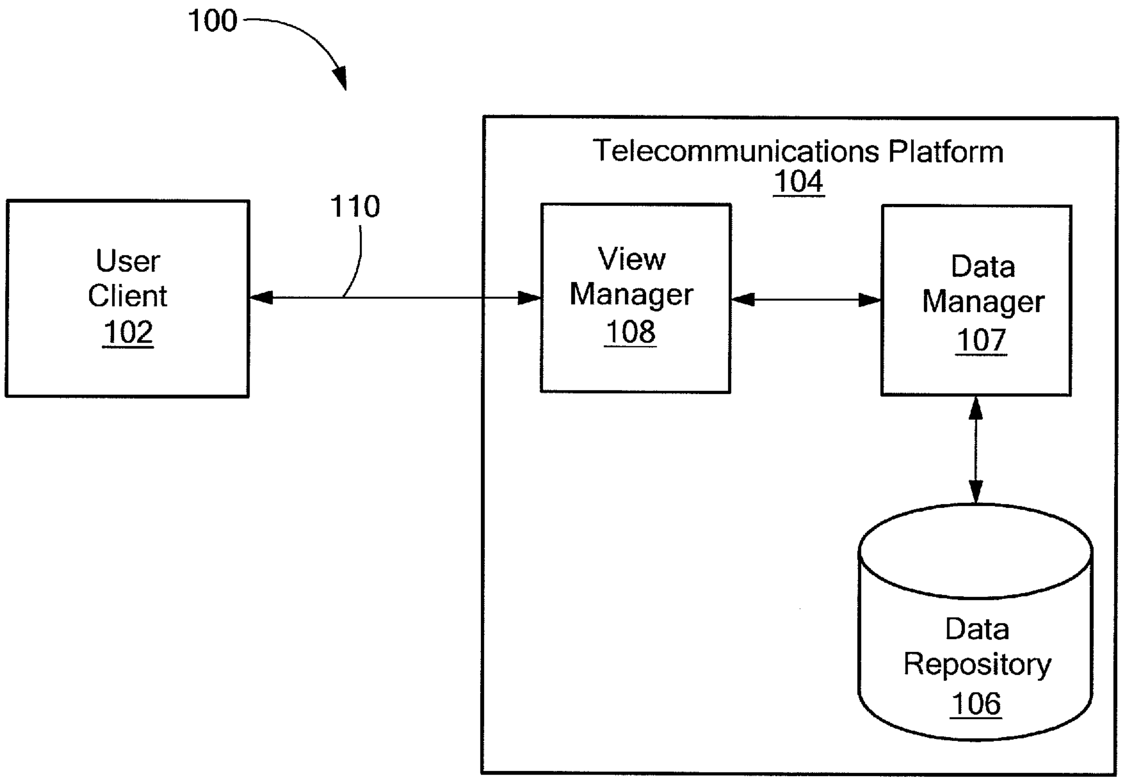
FIG. 1 is a block diagram of an exemplary system for storing and managing data in telecommunications systems and devices (such an exemplary system is also referred to herein as a/the "data storage and management system"), in accordance with an exemplary embodiment of the present application.

FIG. 1 depicts an illustrative embodiment of an exemplary data storage and management system 100, in accordance with an exemplary embodiment of the present application. The exemplary data storage and management system 100 includes a user client 102 and a telecommunications system or device 104 (such a telecommunications system or device is also referred to herein as a/the "telecommunications platform"). For example, the user client 102 can be implemented as any suitable client, including, but not limited to, a web client. Further, the telecommunications platform 104 can be implemented as an access system, a network management system, a media switching center, a cross-connect, a session border controller, or any other suitable telecommunications system or device. In accordance with the illustrative embodiment of FIG. 1, the telecommunications platform 104 includes a data repository 106, a data manager 107, and a view manager component 108. For example, the data repository 106 can be implemented as part of any suitable revision control system that is operative to provide at least one data repository with at least the capabilities of providing access to, creating, modifying, and/or deleting one or more data objects in association with the data manager 107. The data manager 107 also provides the capability of validating data objects stored in the data repository 106 in response to one or more user requests. The data repository 106 is operative to store data, such as configuration data, including, but not limited to, status and management data, as one or more data objects. Moreover, the view manager component 108 can be implemented as any suitable server interface, including, but not limited to, a web server interface. The user client 102 can request access to, and/or manipulation of, the data stored in the data repository 106 of the telecommunications platform 104 over a network via a web browser, which is communicably coupleable to the web server interface of the view manager component 108 via a network connection 110.

Figure 2:
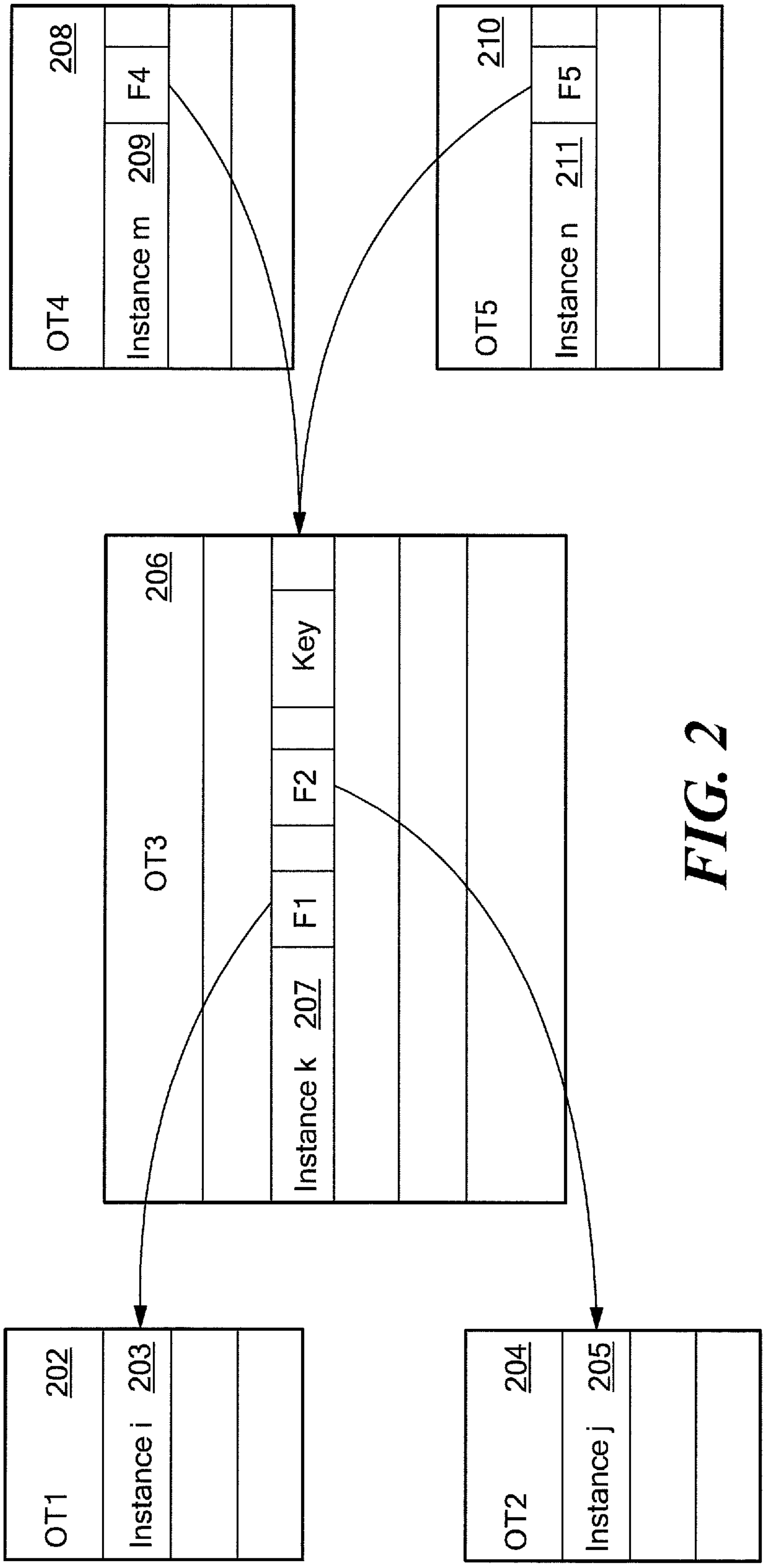
FIG. 2 is a first exemplary representation of a plurality of data object types that can be stored within the exemplary data storage and management system of FIG. 1, for use in describing an exemplary method of maintaining referential integrity among the plurality of data objects when a respective data object is created, modified, and/or deleted.

In accordance with a first exemplary mode of operation of the data storage and management system 100, referential integrity among a plurality of data objects stored in the data repository 106 of the telecommunications platform 104 can be maintained when a respective data object is created, modified, and/or deleted. Each of the plurality of data objects stored in the data repository 106 has an associated object type, and each object type can have at least one instance of the data object. FIG. 2 depicts, for purposes of illustration, representations of a plurality of exemplary object types, which, in this example, are OT1, OT2, OT3, OT4, and OT5, as denoted by reference numerals 202, 204, 206, 208, and 210, respectively. Each of the exemplary object types OT1 202, OT2 204, OT3 206, OT4 208, and OT5 210 has one instance of a data object. Specifically, the object type OT1 202 has an instance, i 203, of a first data object, the object type OT2 204 has an instance, j 205, of a second data object, the object type OT3 206 has an instance, k 207, of a third data object, the object type OT4 208 has an instance, m 209, of a fourth data object, and the object type OT5 210 has an instance, n 211, of a fifth data object. The plurality of data objects having the object types OT1 202, OT2 204, OT3 206, OT4 208, and OT5 210 can be stored in the data repository 106 in a hierarchy of directories in a file system, in which each object type OT1 202, OT2 204, OT3 206, OT4 208, OT5 210 corresponds to a respective directory, and, for each object type, the one instance of a data object is stored in the respective directory in a specific data file, such as an Extensible Markup Language (XML) document file or any other suitable file. For example, the instance, i 203, of the first data object can be stored in a first data file in the respective directory corresponding to the object type OT1 202, the instance, j 205, of the second data object can be stored in a second data file in the respective directory corresponding to the object type OT2 204, the instance, k 207, of the third data object can be stored in a third data file in the respective directory corresponding to the object type OT3 206, the instance, m 209, of the fourth data object can be stored in a fourth data file in the respective directory corresponding to the object type OT4 208, and the instance, n 211, of the fifth data object can be stored in a fifth data file in the respective directory corresponding to the object type OT5 210.

In accordance with the first exemplary mode of operation of the data storage and management system 100 (see FIG. 1), for each instance of the data object for the object type OT3 206 (see FIG. 2), a first list (such a first list is also referred to herein as an/the "add list") is generated, by the data manager 107, that contains a listing of object types that are referred to by the foreign keys of that instance of the data object, and a second list (such a second list is also referred to herein as a/the "delete list") is generated, by the data manager 107, that contains a listing of object types with foreign keys that refer to the primary key associated with that instance of the data object. A primary key field is defined herein as a field associated with an instance of a data object that contains a value referred to herein as a/the "primary key," which can be used to identify that instance of the data object. A foreign key field is defined herein as a field associated with an instance of a first data object that contains a value referred to herein as a/the "foreign key," which can be used to point to the primary key of an instance of a second data object. Such a foreign key can be used to assure referential integrity of data contained in such first and second data objects. As shown in FIG. 2, the instance, k 207, of the third data object for the object type OT3 206 has a primary key field (such a primary key field is also referred to herein as a/the "Key"), which identifies the instance, k 207, of the third data object. The instance, k 207, of the third data object for the object type OT3 206 also has a plurality of foreign key fields, namely, foreign key fields F1, F2, each of which is used to make reference to the Key associated with at least one other data object. Specifically, the foreign key field F1 of the instance, k 207, of the third data object is used to make reference to the Key associated with the instance, i 203, of the first data object for the object type OT1 202, and the foreign key field F2 of the instance, k 207, of the third data object is used to make reference to the Key associated with the instance, j 205, of the second data object for the object type OT2 204. In addition, the instance, m 209, of the fourth data object for the object type OT4 208 has a foreign key field, namely, a foreign key field F4; and, the instance, n 211, of the fifth data object for the object type OT5 210 has a foreign key field, namely, a foreign key field F5. The foreign key field F4 of the instance, m 209, of the fourth data object, and the foreign key field F5 of the instance, n 211, of the fifth data object, are each used to make reference to the Key associated with the instance, k 207, of the third data object for the object type OT3 206. Accordingly, for the instance, k 207, of the third data object for the object type OT3 206, an add list is generated that contains a listing of the object types that are referred to by the foreign key fields F1, F2, namely, the object types OT1 202 and OT2 204, respectively. Further, for the instance, k 207, of the third data object for the object type OT3 206, a delete list is generated that contains a listing of the object types with foreign key fields that refer to the Key associated with that instance, k 207, of the third data object, namely, the object types OT4 208 and OT5 210 with the foreign key fields F4 and F5, respectively.

In further accordance with the first exemplary mode of operation of the data storage and management system 100 (see FIG. 1), at least at some times, an instance of the third data object, such as the instance, k 207, of the third data object for the object type OT3 206, is to be created or modified, thereby causing a first data file (such a first data file is also referred to herein as an/the "add file") to be generated, by the data manager 107, for the object type OT3 206, in which the add file contains the data files for the object type OT3 206, and the data files for the object types OT1 202 and OT2 204 contained in the add list. Using at least the add file, a first data object validation process is performed to check the validity and consistency of the foreign keys of the instances of the data objects for the object type OT3 206. For example, if each instance of the data objects for the respective object types OT1 202, OT2 204, OT3 206, OT4 208, and OT5 210 is stored in a respective directory in an XML document file, then the content of the add file for the object type OT3 206 can include the following:

```
<OT3__add>
  <OT1__list>
    <!-list of all OT1 objects -->
  </OT1__list>
  <OT2__list>
    <!-list of all OT2 objects -->
  </OT2__list>
  <OT3__list>
    <!-list of all OT3 objects -->
  </OT3__list>
</OT3__add>.
```

Further, an XML parser may be employed to perform XML Schema Documentation (XSD) validation in the first data object validation process. Accordingly, the XSD file for the add file for the object type OT3 206 can include the following xs:key and xs:keyref elements:

```
// assuming the key field in object type OT1 is named 'Key1'
<xs:key name="KEY__OT1">
  <xs:selector xpath=".//OT1__list/OT1"/>
  <xs:field xpath="Key1"/>
</xs:key>
// assuming the key field in object type OT2 is named 'Key2'
<xs:key name="KEY__OT2">
  <xs:selector xpath=".//OT2__list/OT2"/>
  <xs:field xpath="Key2"/>
</xs:key>
<xs:keyref name="FKEY__OT3__F1" refer="KEY__OT1">
  <xs:selector xpath=".//OT3__list/OT3"/>
  <xs:field xpath="F1"/>
</xs:keyref>
<xs:keyref name="FKEY__OT3__F2" refer="KEY__OT2">
  <xs:selector xpath=".//OT3__list/OT3"/>
  <xs:field xpath="F2"/>
</xs:keyref>.
```

Moreover, at least at some times, an instance of the third data object, such as the instance, k 207, of the third data object for the object type OT3 206, is to be deleted, thereby causing a second data file (such a second data file is also referred to herein as a/the "delete file") to be generated, by the data manager 107, for the object type OT3 206, in which the delete file contains the data files for the object type OT3 206, and the data files for the object types OT4 208 and OT5 210 contained in the delete list. Using at least the delete file, a second data object validation process is performed to check the validity and consistency of the foreign keys that refer to the instances of the data objects for the object type OT3 206. For example, if each instance of the data objects for the respective object types OT1 202, OT2 204, OT3 206, OT4 208, and OT5 210 is stored in a respective directory in an XML document file, then the content of the delete file for the object type OT3 206 can include the following:

```
<OT3__delete>
  <OT3__list>
    <!-list of all OT3 objects -->
  </OT3__list>
  <OT4__list>
    <!-list of all OT4 objects -->
  </OT4__list>
  <OT5__list>
    <!-list of all OT5 objects -->
  </OT5__list>
</OT3__delete>.
```

Further, an XML parser may be employed to perform XSD validation in the second data object validation process. Accordingly, the XSD file for the delete file for the object type OT3 206 can include the following xs:key and xs:keyref elements:

```
<xs:key name="KEY__OT3">
  <xs:selector xpath=".//OT3__list/OT3"/>
  <xs:field xpath="Key"/>
</xs:key>
<xs:keyref name="FKEY__OT4__F4" refer="KEY__OT3">
  <xs:selector xpath=".//OT4__list/OT4"/>
  <xs:field xpath="F4"/>
</xs:keyref>
<xs:keyref name="FKEY__OT5__F5" refer="KEY__OT3">
  <xs:selector xpath=".//OT5__list/OT5"/>
  <xs:field xpath="F5"/>
</xs:keyref>.
```

If, as a result of performing such data object validation, one or more foreign keys are found to be invalid, then the user's request for access to, creating, modifying, and/or deleting such data objects is rejected. If, instead, all of the foreign keys are found to be valid, then the user's request for access to, creating, modifying, and/or deleting such data objects is allowed. In this way, the referential integrity can be maintained among the first data object for the object type OT1 202, the second data object for the object type OT2 204, the third data object for the object type OT3 206, the fourth data object for the object type OT4 208, and the fifth data object for the object type OT5 210, when a respective third data object for the object type OT3 206 is accessed, created, modified, and/or deleted.

Figure 3:
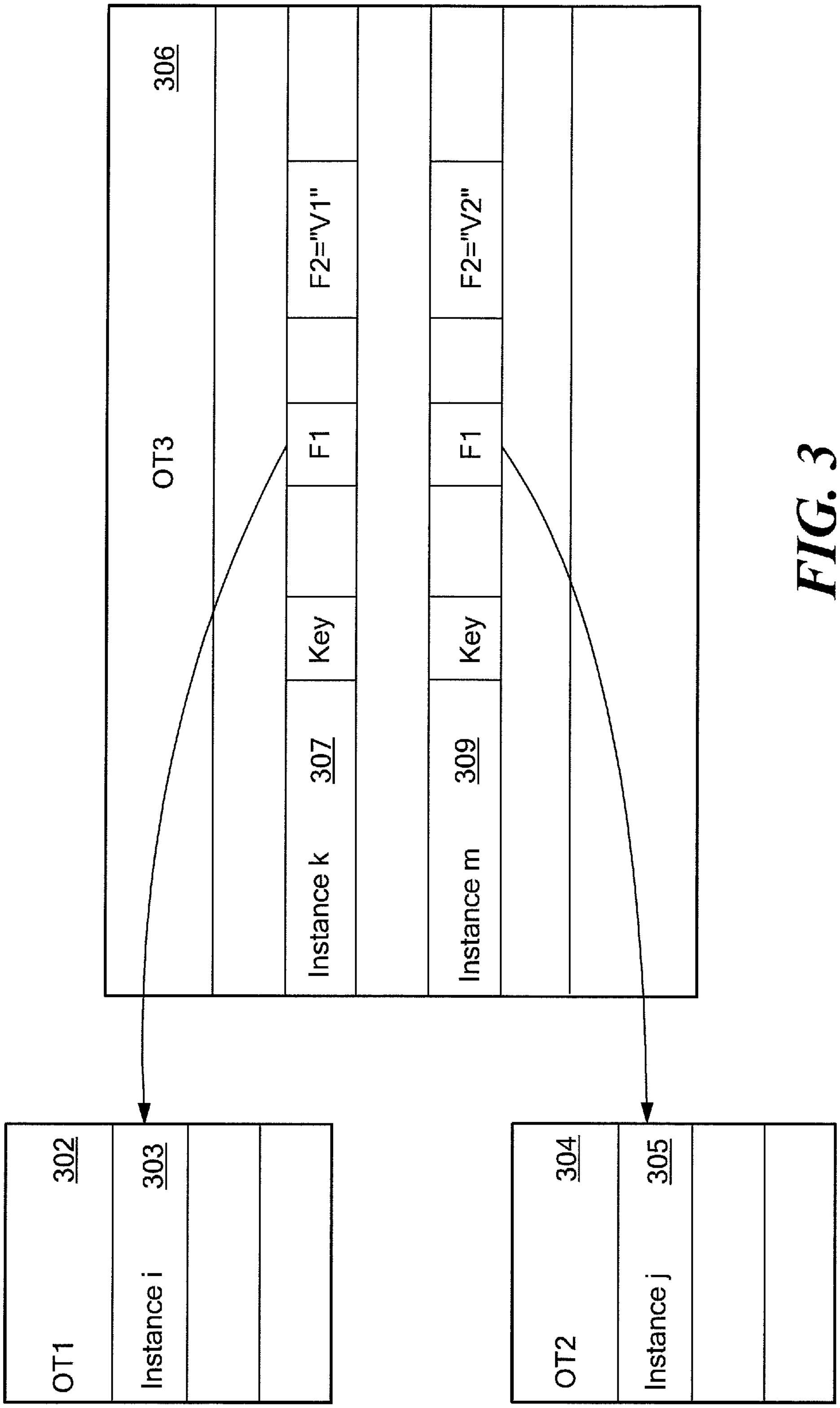
FIG. 3 is a second exemplary representation of a plurality of data object types that can be stored within the exemplary data storage and management system of FIG. 1, for use in describing an exemplary method of establishing a first type of branching referential relationship among the plurality of data objects.

In accordance with a second exemplary mode of operation of the data storage and management system 100 (see FIG. 1), a first type of branching referential relationship can be established among a plurality of data objects stored in the data repository 106 (see FIG. 1) of the telecommunications platform 104 (see FIG. 1). FIG. 3 depicts, for purposes of illustration, representations of a plurality of exemplary object types, which, in this example, are OT1, OT2, and OT3, as denoted by reference numerals 302, 304, and 306, respectively. Each of the exemplary object types OT1 302 and OT2 304 has one instance of a data object. Specifically, the object type OT1 302 has an instance, i 303, of a first data object, and the object type OT2 304 has an instance, j 305, of a second data object. Further, the exemplary object type OT3 306 has two instances of a data object. Specifically, the object type OT3 306 has an instance, k 307, of a third data object, and an instance, m 309, of the third data object. The plurality of data objects can be stored in the data repository 106 in a hierarchy of directories in a file system, in which each object type OT1 302, OT2 304, and OT3 306 corresponds to a respective directory, and, for each object type, each instance of a data object is stored in a specific data file in the respective directory. For example, the instance, i 303, of the first data object can be stored in a first data file in the respective directory corresponding to the object type OT1 302, the instance, j 305, of the second data object can be stored in a second data file in the respective directory corresponding to the object type OT2 304, the instance, k 307, of the third data object can be stored in a third data file in the respective directory corresponding to the object type OT3 306, and the instance, m 309, of the third data object can be stored in a fourth data file in the respective directory corresponding to the object type OT3 306. The instance, k 307, of the third data object for the object type OT3 306, and the instance, m 309, of the third data object for the object type OT3 306, each have an associated Key that identifies that instance of the third data object, a foreign key field F1, and a second field F2. The foreign key field F1 of the instance, k 307, of the third data object for the object type OT3 306 can be used to make reference to the Key associated with the instance, i 303, of the first data object for the object type OT1 302, based on a value V1 contained in the second field F2 of the instance, k 307, of the third data object. Similarly, the foreign key field F1 of the instance, m 309, of the third data object for the object type OT3 306 can be used to make reference to the Key associated with the instance, j 305, of the second data object for the object type OT2 304, based on a value V2 contained in the second field F2 of the instance, m 309, of the third data object. In effect, multiple views of the object type OT3 306 can be defined and maintained based on the value V1 contained in the second field F2 of the instance, k 307, of the third data object, and the value V2 contained in the second field F2 of the instance, m 309, of the third data object.

In accordance with the second exemplary mode of operation of the data storage and management system 100 (see FIG. 1), for a first view of the object type OT3 306 (see FIG. 3), a first add list is generated, by the data manager 107, that contains a listing of at least the object type OT1 302 (see FIG. 3) that is referred to by the foreign key field F1 of the instance, k 307 (see FIG. 3), of the third data object based on the value V1 contained in the second field F2 of the instance, k 307, of the third data object. Further, for a second view of the object type OT3 306 (see FIG. 3), a second add list is generated, by the data manager 107, that contains a listing of at least the object type OT2 304 (see FIG. 3) that is referred to by the foreign key field F1 of the instance, m 309 (see FIG. 3), of the third data object based on the value V2 contained in the second field F2 of the instance, m 309, of the third data object.

In further accordance with the second exemplary mode of operation of the data storage and management system 100 (see FIG. 1), at least at some times, an instance of a data object, such as the instance, k 307, of the third data object for the first view of the object type OT3 306 (see FIG. 3) or the instance, m 309, of the third data object for the second view of the object type OT3 306 (see FIG. 3), is to be created or modified, thereby causing an add file to be generated, by the data manager 107, for the object type OT3 306 (see FIG. 3) that contains the data files for the first and second views of the object type OT3 306 (see FIG. 3), the data files for the object type OT1 302 (see FIG. 3) contained in the first add list, and the data files for the object type OT2 304 (see FIG. 3) contained in the second add list. Using at least the add file, one or more data object validation processes are performed to check the validity and consistency of the foreign keys of the instances of the data objects, such as the instances, k 307 and m 309, of the third data object, for the object type OT3 306 (see FIG. 3). If each instance of the data objects for the object types OT1 302, OT2 304, and OT3 306 is stored in a respective directory in an XML document file, then an XML parser may be employed to perform XSD validation in the data object validation process(es).

For example, if each instance of the data objects for the respective object types OT1 302, OT2 304, and OT3 306 is stored in a respective directory in an XML document file, then the content of the add file for the object type OT3 306 can be defined as follows:

```
<OT1__list>
  <!-list of all OT1 objects -->
</OT1__list>
<OT2__list>
  <!-list of all OT2 objects -->
</OT2__list>
<OT3__list__F2__eq__V1>
  <!-list of all OT3 objects which has value 'V1' in field F2 -->
</OT3__list__F2__eq__V1>
<OT3__list__F2__eq__V2>
```

-continued

```
    <!-list of all OT3 objects which has value ‘V2’ in field F2 -->
  </OT3__list__F2__eq__V2>,
```

in which “OT3_list_F2_eq_V1” is a data object that contains all data objects for the object type OT3 306 where the second field F2 contains the value V1, and “OT3_list_F2_eq_V2” is a data object that contains all data objects for the object type OT3 306 where the second field F2 contains the value V2. It is noted that the content of delete files for the object types OT1 302 and OT2 304 can be defined in a similar fashion.

Further, the XSD file for the add file for the object type OT3 306 can include xs:key and xs:keyref elements defined as follows:

```
// assuming the key field in object type OT1 is named ‘Key1’
<xs:key name=”KEY__OT1”>
   <xs:selector xpath=”.//OT1__list/OT1”/>
   <xs:field xpath=”Key1”/>
</xs:key>
// assuming the key field in object type OT2 is named ‘Key2’
<xs:key name=”KEY__OT2”>
   <xs:selector xpath=”.//OT2__list/OT2”/>
   <xs:field xpath=”Key2”/>
</xs:key>
<xs:keyref name=”FKEY__OT3__F1__REF__OT1” refer=”KEY__OT1”>
   <xs:selector xpath=”.//OT3__list__F2__eq__V1/OT3”/>
   <xs:field xpath=”F1”/>
</xs:keyref>
<xs:keyref name=”FKEY__OT3__F1__REF__OT2” refer=”KEY__OT2”>
   <xs:selector xpath=”.//OT3__list__F2__eq__V2/OT3”/>
   <xs:field xpath=”F1”/>
</xs:keyref>.
```

It is noted that the xs:key and xs:keyref elements included in the XSD file for the delete files for the object types OT1 302 and OT2 304 can be defined in a similar fashion.

If, as a result of performing such data object validation, one or more foreign keys are found to be invalid, then the user's request for access to, creating, and/or modifying such data objects is rejected. If, instead, all of the foreign keys are found to be valid, then the user's request for access to, creating, modifying, and/or deleting such data objects is allowed. In this way, referential integrity can be maintained among the first data object for the object type OT1 302, the second data object for the object type OT2 304, and the third data object for the object type OT3 306 having the first type of branching referential relationship, when a respective data object having the object type OT3 306 is accessed, created, or modified.

Figure 4:
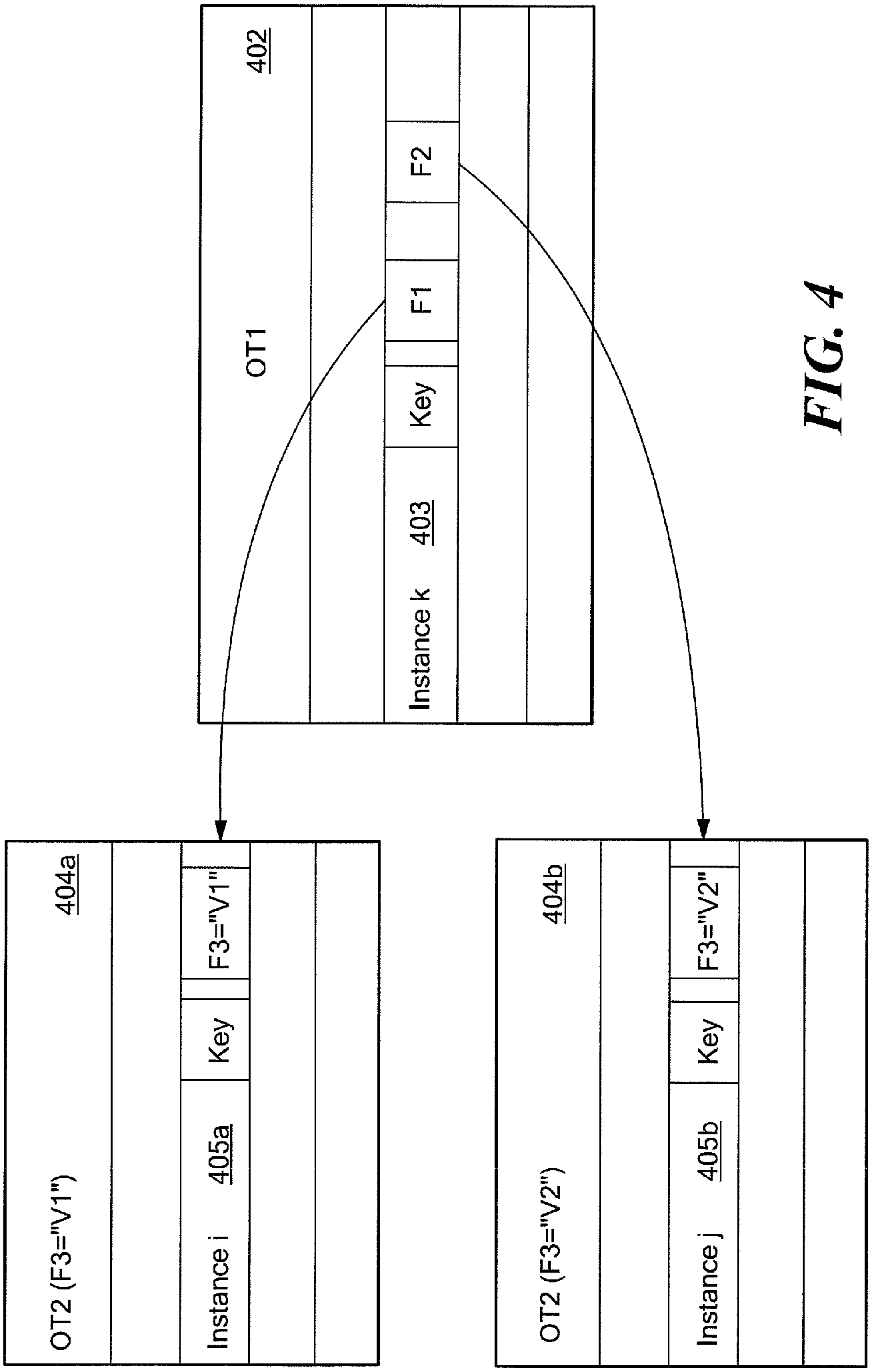
FIG. 4 is a third exemplary representation of a plurality of data object types that can be stored within the exemplary data storage and management system of FIG. 1, for use in describing an exemplary method of establishing a second type of branching referential relationship among the plurality of data objects.

In accordance with a third exemplary mode of operation of the data storage and management system 100 (see FIG. 1), a second type of branching referential relationship can be established among a plurality of data objects stored in the data repository 106 (see FIG. 1) of the telecommunications platform 104 (see FIG. 1). FIG. 4 depicts, for purposes of illustration, representations of a plurality of exemplary object types, which, in this example, are OT1, designated by reference numeral 402, and OT2, with there being two of OT2, one designated by reference numeral 404*a* and the other by reference numeral 404*b*. Each of the exemplary object types OT1 402, OT2 404*a*, and OT2 404*b* has one instance of a data object. Specifically, the object type OT1 402 has an instance, k 403, of a first data object, the object type OT2 404*a* has an instance, i 405*a*, of a second data object, and the object type OT2 404*b* has an instance, j 405*b*, of the second data object. The plurality of data objects can be stored in the data repository 106 in a hierarchy of directories in a file system, in which each object type OT1 402, OT2 404*a*, and OT2 404*b* corresponds to a respective directory, and, for each object type, each instance of a data object is stored in a specific data file in the respective directory. For example, the instance, k 403, of the first data object can be stored in a first data file in the respective directory corresponding to the object type OT1 402, the instance, i 405*a*, of the second data object can be stored in a second data file in the respective directory corresponding to the object type OT2 404*a*, and the instance, j 405*b*, of the second data object can be stored in a third data file in the respective directory corresponding to the object type OT2 404*b*. The instance, k 403, of the first data object for the object type OT1 402 has an associated Key that identifies that instance of the first data object, a first foreign key field F1, and a second foreign key field F2. The instance, i 405*a*, of the second data object for the object type OT2 404*a* has an associated Key that identifies that instance of the second data object, and an additional field F3 (such an additional field associated with the instance, i 405*a*, of the second data object is also referred to herein as a/the “third field”). Similarly, the instance, j 405*b*, of the second data object for the object type OT2 404*b* has an associated Key that identifies that instance of the third data object, and an additional field F3 (such an additional field associated with the instance, j 405*b*, of the second data object is also referred to herein as a/the “third field”). The first foreign key field F1 of the instance, k 403, of the first data object for the object type OT1 402 can be used to make reference to the Key associated with the instance, i 405*a*, of the second data object for the object type OT2 404*a*, based on a value V1 contained in the third field F3 of the instance, i 405*a*, of the second data object. Similarly, the second foreign key field F2 of the instance, k 403, of the first data object for the object type OT1 402 can be used to make reference to the Key associated with the instance, j 405*b*, of the second data object for the object type OT2 404*b*, based on a value V2 contained in the third field F3 of the instance, j 405*b*, of the second data object. In effect, a first view of the object type OT2 404*a*, and a second view of the object type OT2 404*b*, can be defined and maintained based on the values V1, V2 contained in the third fields F3 of the respective instances, i 405*a* and j 405*b*, of the second data object.

In accordance with the third exemplary mode of operation of the data storage and management system 100 (see FIG. 1), for the object type OT1 402, a first add list is generated, by the data manager 107, that contains a listing of at least the first view of the object type OT2 404*a* that is referred to by the first foreign key F1 of the instance, k 403, of the data object OT1 402 for the first object type, based on the value V1 of the third field F3 of the instance, i 405*a*, of the second data object for the object type OT2 404*a*. Further, a second add list is generated, by the data manager 107, that contains a listing of at least the second view of the object type OT2 404*b* that is referred to by the second foreign key F2 of the instance, k 403, of the first data object for the object type OT1 402, based on the value V2 of the third field F3 of the instance, j 405*b*, of the second data object for the object type OT2 404*b*.

In further accordance with the third exemplary mode of operation of the data storage and management system 100 (see FIG. 1), at least at some times, an instance of a data object, such as the instance, k 403, of the data object OT1 402 for the first object type, is to be created or modified, thereby causing an add file to be generated, by the data manager 107, for the object type OT1 402. The add file contains the data files for the data object OT1 402, the data files for the first view of the object type OT2 404*a* contained in the first add list, and the data files for the second view of the object type OT2 404*b* contained in the second add list. Using at least the add file, one or more data object validation processes are performed to check the validity and consistency of the foreign keys of the instance(s) of the data object for the data object OT1 402. For example, if each instance of the data objects for the object types OT1 402, OT2 404*a*, and OT2 404*b* is stored in a respective directory in an XML document file, then an XML parser may be employed to perform XSD validation in the data object validation process(es).

For example, if each instance of the data objects for the respective object types OT1 402, OT2 404*a*, and OT2 404*b* is stored in a respective directory in an XML document file, then the content of the add file for the object type OT1 402 can be defined as follows:

```
<OT2_list_F3_eq_V1>
  <!-list of all OT2 objects which has value 'V1' in field F3 -->
</OT2_list_F3_eq_V1>
<OT2_list_F3_eq_V2>
  <!-list of all OT2 objects which has value 'V2' in field F3 -->
</OT2_list_F3_eq_V2>
<OT1_list>
  <!-list of all OT1 objects -->
</OT1_list>,
```

in which "OT2_list_F3_eq_V1" is a data object that contains all data objects for the object type OT2 404*a* where the third field F3 contains the value V1, and "OT2_list_F3_eq_V2" is a data object that contains all data objects for the object type OT2 404*b* where the third field F3 contains the value V2. It is noted that the content of delete files for the object types OT2 404*a* and OT2 404*b* can be defined in a similar fashion.

Further, the XSD file for the add file for the object type OT1 402 can include xs:key and xs:keyref elements defined as follows:

```
<xs:key name="KEY_OT2_F3_EQ_V1">
  <xs:selector xpath=".//OT2_list_F3_eq_V1/OT2"/>
  <xs:field xpath="Key"/>
</xs:key>
<xs:key name="KEY_OT2_F3_EQ_V2">
  <xs:selector xpath=".//OT2_list_F3_eq_V2/OT2"/>
  <xs:field xpath="Key"/>
</xs:key>
<xs:keyref name="FKEY_OT1_F1" refer="KEY_OT2_F3_EQ_V1">
  <xs:selector xpath=".//OT1_list/OT1"/>
  <xs:field xpath="F1"/>
</xs:keyref>
<xs:keyref name="FKEY_OT1_F2" refer="KEY_OT2_F3_EQ_V2">
  <xs:selector xpath=".//OT1_list/OT1"/>
  <xs:field xpath="F2"/>
</xs:keyref>.
```

It is noted that the xs:key and xs:keyref elements included in the XSD file for the delete files for the object types OT2 404*a* and OT2 404*b* can be defined in a similar fashion.

If, as a result of performing such data object validation, one or more foreign keys are found to be invalid, then the user's request for access to, creating, and/or modifying such data objects is rejected. If, instead, all of the foreign keys are found to be valid, then the user's request for access to, creating, modifying, and/or deleting such data objects is allowed. In this way, referential integrity can be maintained among the first data object for the object type OT1 402, and the second data objects for the respective object types OT2 404*a* and OT2 404*b* having the second type of branching referential relationship, when a respective data object having the object type OT1 402 is accessed, created, or modified.

Figure 5:
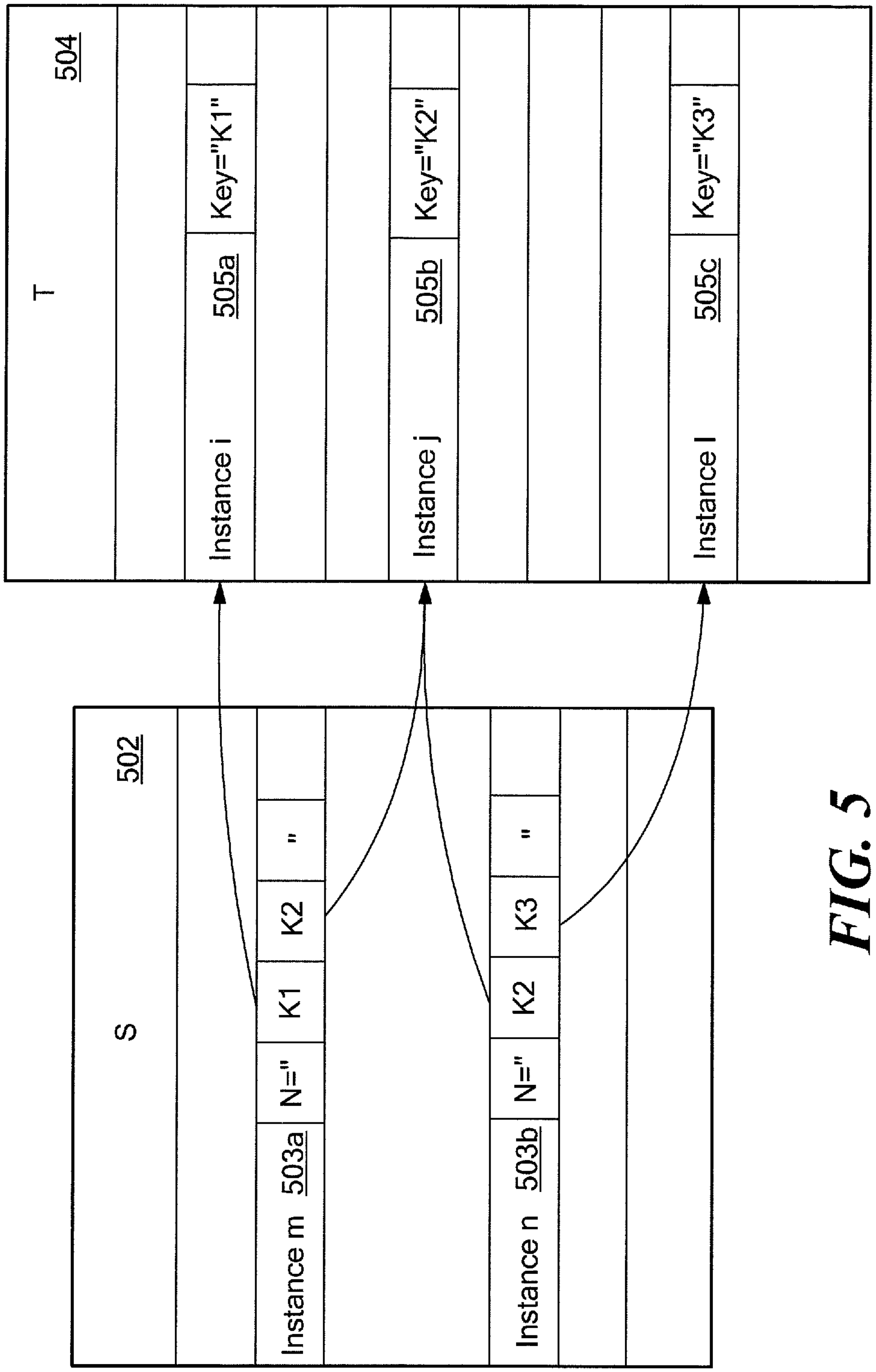
FIG. 5 is a fourth exemplary representation of a plurality of data object types that can be stored within the exemplary data storage and management system of FIG. 1, for use in describing an exemplary method of establishing a many-to-many relationship between the plurality of object types.

In accordance with a fourth exemplary mode of operation of the data storage and management system 100 (see FIG. 1), a many-to-many relationship can be established between a plurality of object types stored in the data repository 106 (see FIG. 1) of the telecommunications platform 104 (see FIG. 1). FIG. 5 depicts, for purposes of illustration, representations of a plurality of exemplary object types, which, in this example, are S and T, as denoted by reference numerals 502 and 504, respectively. Each of the exemplary object types S 502 and T 504 has a plurality of instances of an object type. Specifically, the object type S 502 has an instance, m 503*a*, of a first object type and an instance, n 503*b*, of the first object type. Further, the object type T 504 has an instance, i 505*a*, of a second object type, an instance, j 505*b*, of the second object type, and an instance, l 505*c*, of the second object type. The plurality of data objects can be stored in the data repository 106 in a hierarchy of directories in a file system, in which each object type S 502 and T 504 corresponds to a respective directory, and, for each object type, each instance of the object type is stored in a specific data file in the respective directory. For example, the instance, m 503*a*, of the object type S 502 can be stored in a first data file in the respective directory corresponding to the object type S 502, the instance, n 503*b*, of the object type S 502 can be stored in a second data file in the respective directory corresponding to the object type S 502, the instance, l 505*a*, of the object type T 504 can be stored in a third data file in the respective directory corresponding to the object type T 504, the instance, j 505*b*, of the object type T 504 can be stored in a fourth data file in the respective directory corresponding to the object type T 504, and the instance, l 505*c*, of the object type T 504 can be stored in a fifth data file in the respective directory corresponding to the object type T 504.

In further accordance with the fourth exemplary mode of operation of the data storage and management system 100 (see FIG. 1), the instance, i 505*a* (see FIG. 5), of the object type T 504 (see FIG. 5) has an associated Key having a value K1 that identifies that instance of the object type T 504. Similarly, the instance, j 505*b* (see FIG. 5), of the object type T 504 (see FIG. 5) has an associated Key having a value K2 that identifies that instance of the object type T 504, and the instance, l 505*c* (see FIG. 5), of the object type T 504 (see FIG. 5) has an associated Key having a value K3 that identifies that instance of the object type T 504. The instance, m 503*a* (see FIG. 5), of the object type S 502 (see FIG. 5) has a nested foreign key field N that includes a sequence of foreign key fields having the values K1 and K2. Similarly, the instance, n 503*b* (see FIG. 5), of the object type S 502 (see FIG. 5) has a nested foreign key field N that includes a sequence of foreign key fields having the values K2 and K3. For example, if each instance, m 503*a* and n 503*b*, of the object type S 502 is stored in a respective directory in an XML document file, then the nested foreign key field N included in the instance, m 503*a* (see FIG. 5), of the object type S 502 can be expressed as an element that contains a sequence of sub-elements, as follows:

<*N*><*FK*Id>*K*1</*FK*Id><*FK*Id>*K*2</*FK*Id></*N*>. (1)

Similarly, the nested foreign key field N included in the instance, n 503*b* (see FIG. 5), of the object type S 502 can be expressed as an element that contains a sequence of sub-elements, as follows:

<*N*><*FK*Id>*K*2</*FK*Id><*FK*Id>*K*3</*FK*Id></*N*>. (2)

The nested foreign key field N of the instance, m 503*a*, of the object type S 502 can be used to make reference to the Key associated with the instance, i 505*a*, of the object type T 504, based on the value K1 contained in the sequence of foreign key fields of the instance, m 503*a*, of the object type S 502. The nested foreign key field N of the instance, m 503*a*, of the object type S 502 can also be used to make reference to the Key associated with the instance, j 505*b*, of the object type T 504, based on the value K2 contained in the sequence of foreign key fields of the instance, m 503*a*, of the object type S 502. Similarly, the nested foreign key field N of the instance, n 503*b*, of the object type S 502 can be used to make reference to the Key associated with the instance, j 505*b*, of the object type T 504, based on the value K2 contained in the sequence of foreign key fields of the instance, n 503*b*, of the object type S 502. The nested foreign key field N of the instance, n 503*b*, of the object type S 502 can also be used to make reference to the Key associated with the instance, l 505*c*, of the object type T 504, based on the value K3 contained in the sequence of foreign key fields of the instance, n 503*b*, of the object type S 502.

For example, if each instance of the data objects for the respective object types S 502 and T 504 is stored in a respective directory in an XML document file, then the content of the add file for the object type S 502 can be defined as follows:

```
<T_list>
  <!-list of all T objects -->
</T>
<S_list>
  <!-list of all S objects -->
</S_list>.
```

It is noted that the content of a delete file for the object type T 504 can be defined in a similar fashion.

Further, the XSD file for the add file for the object type S 502 can include xs:key and xs:keyref elements defined as follows:

```
<xs:key name="KEY_T">
  <xs:selector xpath=".//T_list/T"/>
  <xs:field xpath="Key"/>
</xs:key>
<xs:keyref name="FKEY_S_N" refer="KEY_T">
  <xs:selector xpath=".//S_list/S/N/FKId"/>
  <xs:field xpath="."/>
</xs:keyref>.
```

It is noted that the xs:key and xs:keyref elements included in the XSD file for the delete file for the object type T 504 can be defined in a similar fashion.

Using the nested foreign key field N of the instance, m 503*a*, of the object type S 502, and the nested foreign key field N of the instance, n 503*b*, of the object type S 502, a many-to-many relationship between the first and second data objects can be established without having to create any new association object types, as would typically be required if a relational database management system were employed.

Figure 6:
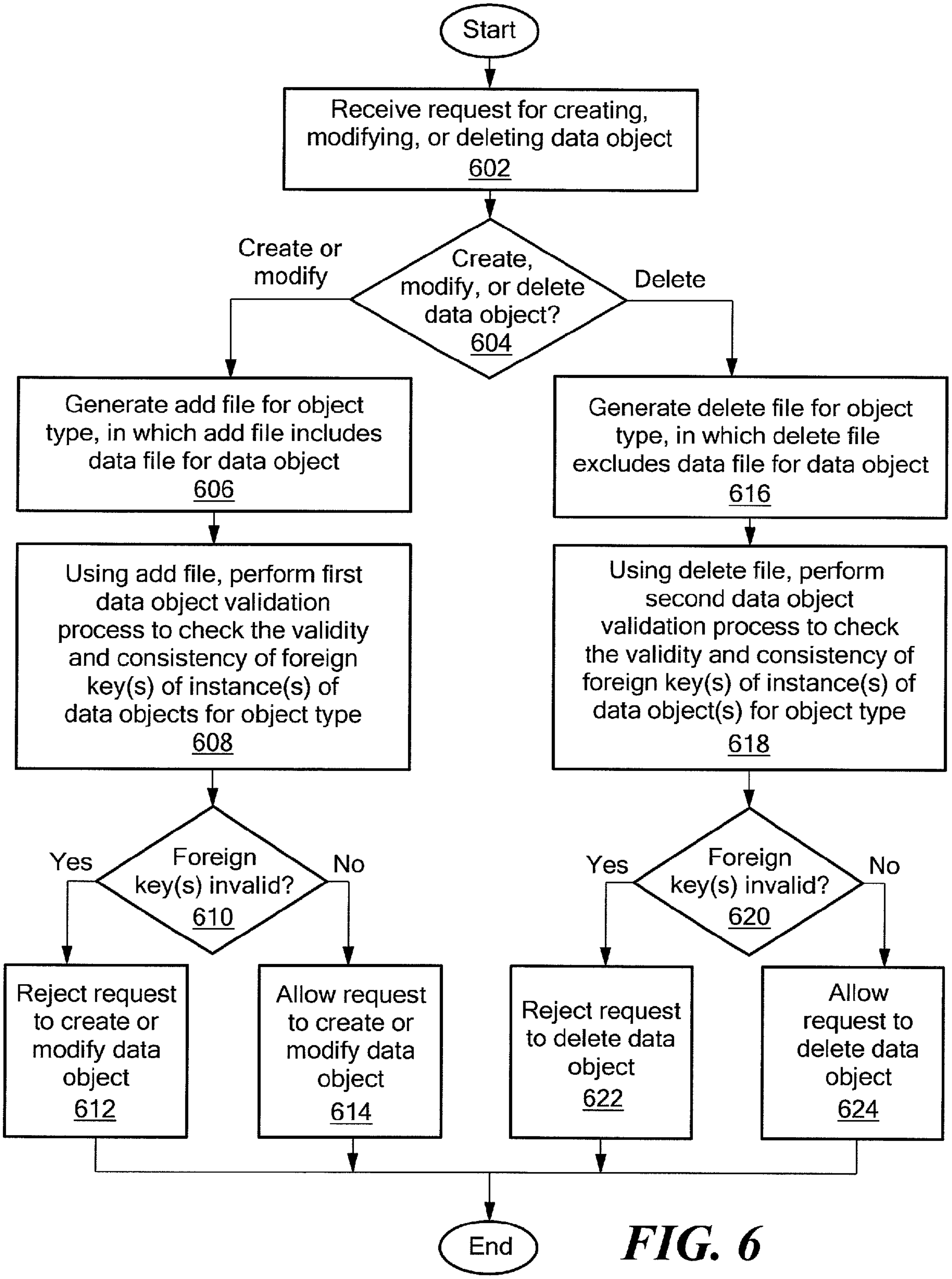
FIG. 6 is a flow diagram of an exemplary method of operating the exemplary data storage and management system of FIG. 1.

An exemplary method of operation for the data storage and management system 100 is described below with reference to FIG. 6, as well as FIG. 1. As depicted in step 602 (see FIG. 6), a request from the user client 102 (see FIG. 1) is received, at the view manager 108 (see FIG. 1), for creating, modifying, or deleting a data object, A, of object type, T, stored in the data repository 106 (see FIG. 1). As depicted in step 604, a determination is made as to whether the data object, A, is to be created, modified, or deleted. In the event the data object, A, is to be created or modified, an add file for the object type, T, is generated, by the data manager 107 (see FIG. 1), in which the add file includes a data file for the data object, A, as depicted in step 606. As depicted in step 608, using the add file, a first data object validation process is performed, by the data manager 107, to check the validity and consistency of foreign keys of instances of one or more data objects, including the data object, A, for the object type, T. As depicted in step 610, a determination is made as to whether or not any of the foreign keys are found to be invalid. In the event one or more of the foreign keys are found to be invalid, the user's request for creating or modifying the data object, A, is rejected, as depicted in step 612. In the event all of the foreign keys are found to be valid, the user's request for creating or modifying the data object, A, is allowed, as depicted in step 614. If, instead, the data object, A, is to be deleted, a delete file for the object type, T, is generated, by the data manager 107, in which the delete file excludes the data file for the data object, A (because the data object, A, is to be deleted), as depicted in step 616. As depicted in step 618, using the delete file, a second data object validation process is performed, by the data manager 107, to check the validity and consistency of foreign keys of instances of one or more data objects for the object type, T. As depicted in step 620, a determination is made as to whether or not any of the foreign keys are found to be invalid. In the event one or more of the foreign keys are found to be invalid, the user's request for deleting the data object, A, is rejected, as depicted in step 622. In the event all of the foreign keys are found to be valid, the user's request for deleting the data object, A, is allowed, as depicted in step 624.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

Although the presently disclosed systems and methods of storing and managing data were described herein with reference to configuration data for one or more telecommunications systems and/or devices, it is noted that such data can include, but are not limited to, configuration data for telecommunications systems and/or devices. The disclosed systems and methods of storing and managing data may be used to store and manage any suitable data that includes multiple data object types with referential relations among the data object types. The disclosed systems and methods of storing and managing data may also be employed in any suitable environment in which one or more users have the capability of creating, modifying, and/or deleting data objects.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of storing and managing data in a telecommunications system or device, comprising the steps of:

storing, in a data repository, at least a first instance of a first data object for a first object type, wherein the first instance of the first data object has a primary key that identifies the first instance of the first data object, and one or more foreign keys that reference one or more primary keys of one or more instances of one or more other data objects for one or more other object types;

generating, by a data manager, a first list of at least the one or more other object types;

in response to a first user request to access an instance of the first data object for the first object type, generating, by the data manager, a first data file that contains (1) first data pertaining to the respective foreign keys of at least the first instance of the first data object, and, (2) for at least the one or more other object types in the first list, second data pertaining to the one or more primary keys of the one or more instances of the one or more other data objects referenced by the respective foreign keys of at least the first instance of the first data object;

using at least the first data and the second data contained in the first data file, performing, by the data manager, a first data object validation process to determine a validity of each foreign key of at least the first instance of the first data object; and in the event each foreign key of at least the first instance of the first data object is determined to be valid, allowing the first user request.

2. The method of claim 1 wherein the generating of the first data file includes generating the first data file in response to a first user request to modify an instance of the first data object for the first object type.

3. The method of claim 1 wherein the generating of the first data file includes generating the first data file in response to a first user request to create an instance of the first data object for the first object type.

4. The method of claim 1 further comprising:

generating, by the data manager, a second list of one or more other object types for which one or more instances of one or more other data objects have one or more foreign keys that refer to the primary key of at least the first instance of the first data object.

5. The method of claim 4 further comprising:

in response to a second user request to delete an instance of the first data object for the first object type, generating, by the data manager, a second data file that contains, (1) for at least the one or more other object types in the second list, third data pertaining to the respective foreign keys of the one or more instances of the one or more other data objects, and (2) fourth data pertaining to the primary key of at least the first instance of the first data object referenced by the respective foreign keys of the one or more instances of the one or more other data objects for the other object types in the second list.

6. The method of claim 5 further comprising:

using at least the third data and the fourth data contained in the second data file, performing, by the data manager, a second data object validation process to determine a validity of each foreign key of the one or more instances of the one or more other data objects for the one or more other object types in the second list.

7. The method of claim 1 wherein the storing of at least the first instance of the first data object for the first object type includes storing at least the first instance of the first data object in an Extensible Markup Language (XML) document file.

8. The method of claim 7 wherein the performing of the first data object validation process includes performing an XML Schema Documentation (XSD) validation process.

9. A system for storing and managing data in a telecommunications system or device, comprising:

at least one computerized data repository operative to store at least a first instance of a first data object for a first object type, wherein the first instance of the first data object has a primary key that identifies the first instance of the first data object, and one or more foreign keys that reference one or more primary keys of one or more instances of one or more other data objects for one or more other object types; and a data manager including at least one processor operative to execute at least one program out of at least one memory:

to generate a list of at least the one or more other object types;

in response to a first user request to access an instance of the first data object for the first object type, to generate a data file that contains (1) first data pertaining to the respective foreign keys of at least the first instance of the first data object, and, (2) for at least the one or more other object types in the list, second data pertaining to the one or more primary keys of the one or more instances of the one or more other data objects referenced by the respective foreign keys of at least the first instance of the first data object;

using at least the first data and the second data contained in the data file, to perform a data object validation process to determine a validity of each foreign key of at least the first instance of the first data object; and in the event each foreign key of at least the first instance of the first data object is determined to be valid, to allow the first user request.

10. A method of storing and managing data in a telecommunications system or device, comprising:

storing, in a data repository, at least an instance of a first data object for a first object type, the instance of the first data object having a primary key that identifies the instance of the first data object, and one or more foreign keys that reference a primary key of at least an instance of a second data object for a second object type; and in response to a user request to add or modify an instance of the first data object for the first object type:

generating, by the data manager, an add file that contains (1) first data pertaining to the respective foreign keys of at least the instance of the first data object, and (2) second data pertaining to the primary key of at least the instance of the second data object referenced by the respective foreign keys of at least the instance of the first data object;

using at least the first data and the second data contained in the add file, performing, by the data manager, a first data object validation process to determine a validity of each foreign key of at least the instance of the first data object; and in the event each foreign key of at least the instance of the first data object is determined to be valid, adding or modifying the instance of the first data object for the first object type.

11. The method of claim 10 further comprising:

storing, in the data repository, at least an instance of a third data object for a third object type, the instance of the third data object having one or more foreign keys that reference the primary key of at least the instance of the first data object for the first object type; and in response to a user request to delete an instance of the first data object for the first object type:

generating, by the data manager, a delete file that contains (1) first data pertaining to the respective foreign keys of at least the instance of the third data object, and (2) second data pertaining to the primary key of at least the instance of the first data object referenced by the respective foreign keys of at least the instance of the third data object;

using at least the first data and the second data contained in the delete file, performing, by the data manager, a second data object validation process to determine a validity of each foreign key of at least the instance of the third data object; and in the event each foreign key of at least the instance of the third data object is determined to be valid, deleting the instance of the first data object for the first object type.

* * * * *